Feb. 26, 1952  C. A. MAXWELL ET AL  2,587,500
ANIMAL TRAP
Filed April 27, 1948  2 SHEETS—SHEET 1
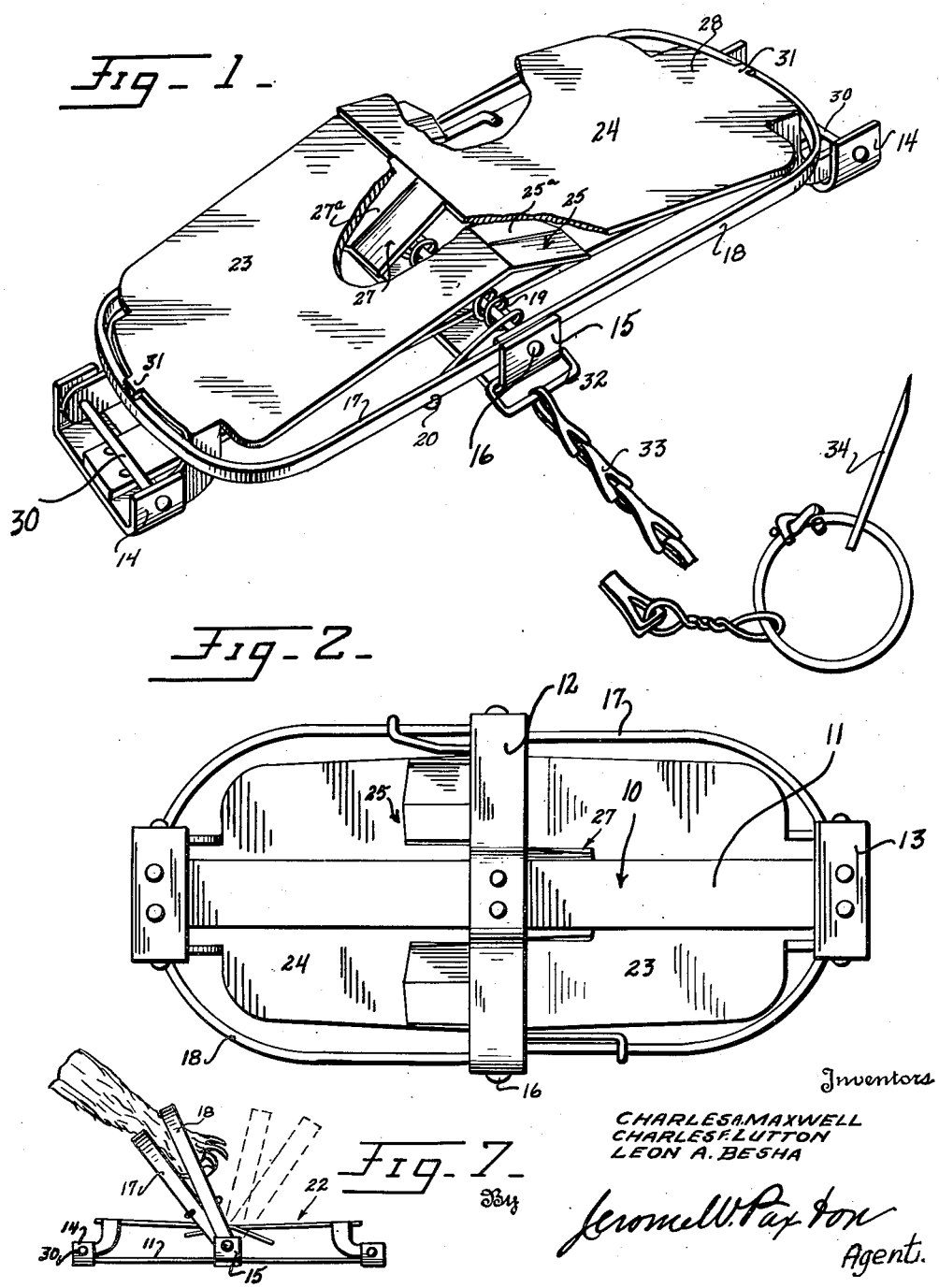
Inventors
CHARLES A. MAXWELL
CHARLES F. LUTTON
LEON A. BESHA
By Jerome W. Paxton
Agent.

Feb. 26, 1952 C. A. MAXWELL ET AL 2,587,500
ANIMAL TRAP
Filed April 27, 1948 2 SHEETS—SHEET 2
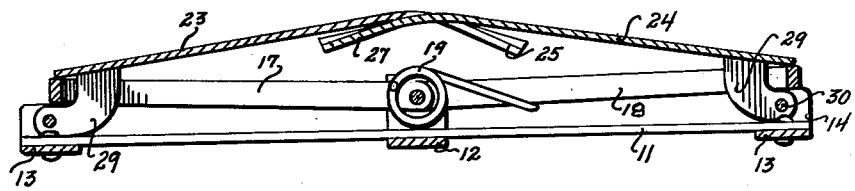
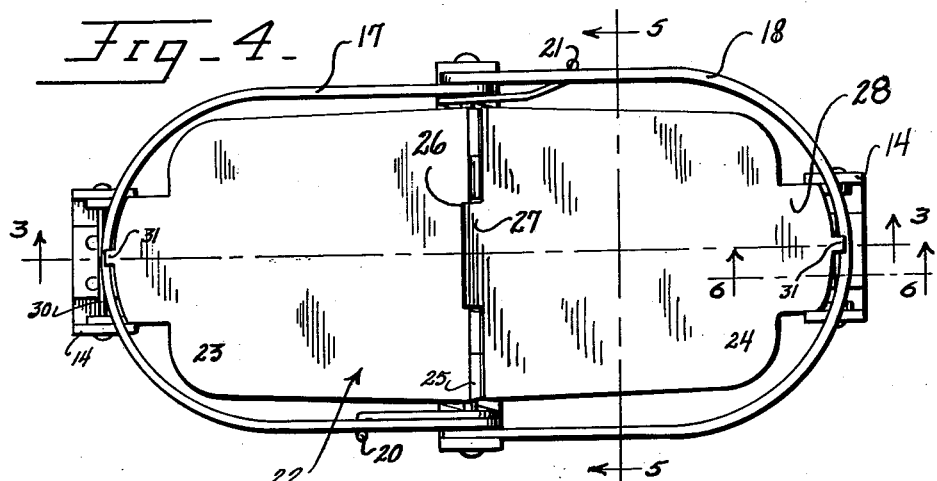
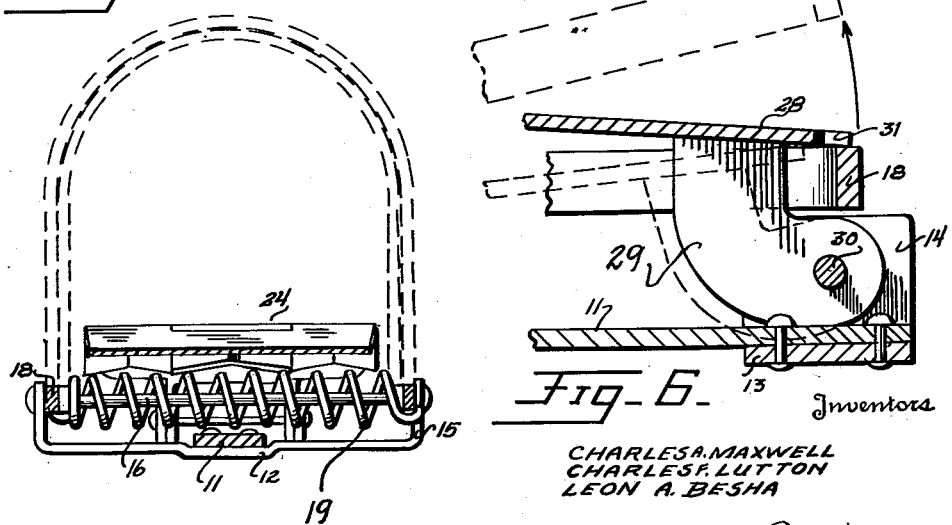
Inventors
CHARLES A. MAXWELL
CHARLES F. LUTTON
LEON A. BESHA
By Jennie W. Payton
Agent.

Patented Feb. 26, 1952

2,587,500

UNITED STATES PATENT OFFICE 2,587,500

ANIMAL TRAP

Charles A. Maxwell, Freeville, and Charles F. Lutton and Leon A. Besha, Ithaca, N. Y.

Application April 27, 1948, Serial No. 23,548

3 Claims. (Cl. 43—93)

The present invention relates to animal traps, and more particularly to animal traps of the type wherein the spring pressure is the motivating force for urging the jaws into operative position. While we have shown and described our trap as being particularly efficacious for use in trapping small animals, such as rabbits, muskrats, minks or weasels, it is, of course, obvious that by immaterial changes in the dimensions, it may be used for larger game.

We, of course, are well aware that animal traps of the spring jaw type have heretofore been widely employed. However, the present invention covers a construction which possesses numerous advantages over the prior devices, due, in no small part, to its simple structure and positive and efficient operation.

Broadly, the invention comprises a suitable base to which a pair of arms is pivoted on a common pivot rod surrounded by a spring, each end of which is suitably associated with each jaw. A jaw tripping device of substantial dimensions is also pivotally attached to the base and is provided with means which cooperate with the jaws to maintain the jaws in their open or inoperative position. The tripping device is so constructed that when pressure is applied to any part thereof, the trap becomes active. By employing a single spring for both jaws, the jaw releasing means is such that if the animal should apply pressure to one end thereof, the jaw at that end will remain stationary, whereas the opposite jaw will be released and moved with great force toward the stationary jaw, thereby trapping the animal. If, however, the animal should step into the middle or a location adjacent the middle of the trap, the jaw releasing mechanism will release both jaws with equal force. Hence, it can be seen that regardless of the manner of entry of the animal to the trap, one or both jaws will be quickly and positively released, thereby assuring entrapment of the animal.

Accordingly, an important object of the present invention is to provide an animal trap wherein a single spring is employed for imparting movement to the jaws thereof.

Another object of the present invention is to provide an animal trap of the jaw type wherein the jaw releasing assembly includes a resilient plate-like member of substantial dimensions which is pivoted to the base of the trap in such a manner as to maintain the jaws in their open position and yet quickly and readily release one or both of said jaws upon the application of pressure to any area of the plate-like member.

Yet another object of the present invention is to provide a resilient plate-like member for actuating the jaws of a trap of the character set forth, wherein said member comprises a pair of plates which are interconnected in such a manner at their inner ends that one or both of the jaws will be released when pressure is applied to any part of the resilient plate-like member.

And yet another object of our invention is to provide a trap of the type described which may be quickly and easily set without any danger of injury to the hands of the operator.

Still another object of the present invention is to provide an animal trap of the so-called spring jaw type which is simple in structural details, positive in operation, and capable of being inexpensively manufactured.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is a view in perspective of an animal trap constructed in accordance with our inventive concept.

Figure 2 is a bottom view of the trap shown in Figure 1.

Figure 3 is a sectional view taken along the line 3—3 of Figure 4, looking in the direction of the arrows.

Figure 4 is a top plan view of the trap shown in Figure 1.

Figure 5 is a sectional view taken along the line 5—5 of Figure 4, looking in the direction of the arrows, the jaws being shown in their closed position by the broken lines.

Figure 6 is a sectional view taken along the line 6—6 of Figure 4, looking in the direction of the arrows, but being on an enlarged scale.

Figure 7 is a side elevational view showing the manner in which the jaws cooperate to entrap an animal.

Referring to the drawings, and more particularly to Figures 2 and 4, there is shown a base 10 comprising a longitudinally extending strap or plate 11 having a transversely extending strap 12 secured thereto intermediate the ends thereof. A bracket 13 having an upstanding ear or lug 14 at each end thereof is riveted or otherwise conveniently secured to each end of the strap 11.

The strap 12 is upturned at each end, as shown at 15, and each upturned portion 15 functions as a bearing for a pivot rod 16. U-shaped jaws 17 and 18 have their free ends attached to the rod 16 as clearly shown in Figure 4, and a helical spring 19 surrounds the rod 16. One end of the helical spring 19 has end 20 bearing against the jaw 17, whereas the opposite end 21 is in operative relation to the jaw 18. It can be clearly seen that the spring 19 tends to urge the jaws 17 and 18 together.

To maintain the jaws 17 and 18 open or in their inoperative position and yet provide for the easy and instantaneous release of one or both of the jaws, we provide a jaw releasing assembly, designated generally 22. The jaw releasing assembly comprises a pair of interconnected resilient plate-like members 23 and 24. It will be noted that the inner end of the plate-like member 23 is formed with a pair of spaced tongues 25 which are inclined downwardly with respect to the upper surface of the plate and are separated by slotted portion 26. The inner end of the opposite plate member 24 is formed with a tongue 27 intermediate the side edges of the plate, and the tongue 27 is of such dimensions as to extend into the slotted portion of the plate 23. It will be noted that each tongue 25 (Figures 1 and 5) is formed with downwardly inclined walls 25a and the tongue 27 is formed with similar inclined walls 27a. Hence, when the plates 23 and 24 are interlocked, as shown in the drawings, the area of contact between the tongues 25 and the under side of the plate 24 is very small and the same is true of the contact between the tongue 27 and the under face of the plate 23. This means, of course, that the jaw releasing assembly may work freely and provide a hair trigger arrangement for actuating the jaws 17 and 18. As clearly indicated in Figure 3, the plates 23 and 24 are interlocked at the mid-point of the jaw releasing assembly and this connection is immediately above the point of pivot of the jaws 17 and 18 to the pivot rod 16.

The opposite or outer end of each of the plates 23 and 24 is formed to provide a reduced extension 28, and a pair of parallel gooseneck members 29 depends downwardly and forwardly from the extension 28. The gooseneck members 29 are pivotally attached to the ears 14 of the bracket 13 by a pin 30. It will further be noted that a projection 31 extends from approximately the mid-point of the front edge of each extension 28 and is adapted to extend over the jaws 17 and 18 and thereby hold them in their inoperative position.

In operation, with the jaws in the position shown in Figure 4, should an animal step upon the plate 24 adjacent its outer end, the projection 31 on the opposite plate 23 will be moved away from the jaw 17 by virtue of the connection between the plates 24 and 23, whereas the projection 31 on the plate 24 will remain in contact with the jaw 18. The spring 19 will immediately urge the jaw 17 with great force toward the jaw 18 and thereby trap the animal. On the other hand, if the animal should enter in the vicinity of the middle of the jaw releasing assembly 22, jaws 17 and 18 will both be released and will move together with equal force and will thus entrap the animal.

To prevent the trap from being carried away, it will be noted that a metal loop 32 is operatively connected to the strap 16, and a length of chain or the like 33 is attached to the loop. The opposite or free end of the chain may carry a penetrating implement 34 which may be driven into the ground.

It is thought obvious from the above description that we have provided an animal trap which is of a very simple construction, efficient in operation, and which can be made inexpensively. The jaw releasing mechanism is so constructed that the trap is rendered active upon the application of pressure to any part of the assembly. Moreover, the trap will not throw the animal which is, of course, a common disadvantage insofar as currently employed animal traps are concerned. The trap may be very easily set by pulling the jaws 17 and 18 apart with the thumb of each hand and by pushing the plates 23 and 24 upwardly with the free fingers of each hand. This upward movement will move the projection 31 on each plate over the respective jaws, thereby holding them in their inoperative position until released by the jaw releasing assembly.

As hereinbefore adverted to, by the use of the single helical spring and the type of jaw releasing assembly employed, it is possible to release either one or both of the jaws immediately upon application of pressure by the animal to the assembly which, of course, is highly desirable.

The invention is not to be confined to any strict conformity with the showing in the drawings, but may be changed or modified so long as such changes or modifications mark no material departure from the salient features of the invention as expressed in the appended claims.

We claim:

1. In an animal trap, a base, a pair of spring actuated jaws pivoted to said base for movement towards each other, a pair of resilient plate members having their outer ends pivoted to the base, the inner end of one of the plate members being provided with spaced longitudinally extending tongues, the inner end of the other plate member having a single longitudinally extending tongue adapted to extend into the hiatus between the spaced tongues beneath the plate member, the said spaced tongues extending beneath the other plate on opposite sides of the single longitudinally extending tongue whereby the plate members are interlocked, and a projection at the outer end of each plate member adapted to extend over each jaw for maintaining said jaws in open position, the arrangement being such that the application of pressure to one of said plate members will move the projection on the other plate member away from the jaw whereby said latter jaw moves toward the other jaw.

2. In an animal trap, a base, a pivot rod extending transversely of the base and journaled therein, a pair of jaws having their ends secured to said pivot rod, a single spring surrounding the pivot rod and having the ends thereof operatively connected to said jaws for moving said jaws together, a pair of resilient plate members having their outer ends pivoted to the base, the inner end of one of the plate members being provided with spaced longitudinally extending tongues, the inner end of the other plate member having a single longitudinally extending tongue adapted to extend into the hiatus between the spaced tongues beneath the plate member, the said spaced tongues extending beneath the other plate on opposite sides of the single longitudinally extending tongue whereby the plate members are interlocked, and a projection at the outer end of each plate member adapted to extend over each jaw for maintaining said jaws in open position, the arrangement being such that the application of pressure to either of said plate members causes movement of at least one of said jaws toward the other.

3. An animal trap comprising a base, a pivot rod extending laterally of the base and journaled therein, a pair of U-shaped jaws having their open inner ends secured to said pivot rod, a single spring surrounding the pivot rod and having the ends thereof operatively connected to said jaws for moving said jaws together, a pair of resilient plate-like members having their outer ends pivoted to the base, the inner end of one of the plate members being provided with spaced longitudinally extending tongues, the inner end of the other plate member having a single longitudinally extending tongue adapted to extend into the hiatus between the spaced tongues beneath the plate member, the said spaced tongues extending beneath the other plate on opposite sides of the single longitudinally extending tongue whereby the plate members are interlocked, and a projection at the outer end of each plate-like member adapted to extend over each jaw to maintain the jaws in open position, the arrangement being such that the application of pressure to either of said plate-like members effects movement of the projection away from the jaw to permit said jaw to move toward the other jaw.

CHARLES A. MAXWELL.
CHARLES F. LUTTON.
LEON A. BESHA.

REFERENCES CITED

The following references are of record in the file of this patent:

UNITED STATES PATENTS

| Number | Name | Date |
|---|---|---|
| 120,877 | Howell | Nov. 14, 1871 |
| 877,134 | Sprague et al. | Jan. 21, 1908 |
| 1,012,386 | Mainland | Dec. 19, 1911 |
| 1,161,891 | Roy | Nov. 30, 1915 |
| 1,494,918 | Kleinpeter | May 20, 1924 |
| 1,612,608 | Chamberlin | Dec. 28, 1926 |
| 1,617,987 | Bond | Feb. 15, 1927 |
| 1,738,448 | Rollins | Dec. 3, 1929 |